(12) United States Patent
Rogan et al.

(10) Patent No.: US 9,641,411 B1
(45) Date of Patent: May 2, 2017

(54) ESTIMATING LATENT DEMAND WITH USER PRIORITIZATION

(71) Applicant: Google Inc., Mountain View, CA (US)

(72) Inventors: Brian Rogan, Cambridge, MA (US); Richard Benjamin Leider, Mountain View, CA (US); Devin Richard Kennedy, Boston, MA (US)

(73) Assignee: Google Inc., Mountain View, CA (US)

( * ) Notice: Subject to any disclaimer, the term of this patent is extended or adjusted under 35 U.S.C. 154(b) by 597 days.

(21) Appl. No.: 14/104,562

(22) Filed: Dec. 12, 2013

(51) Int. Cl.
| | |
|---|---|
| *G06Q 10/06* | (2012.01) |
| *G06Q 30/02* | (2012.01) |
| *H04L 12/26* | (2006.01) |
| *H04W 24/08* | (2009.01) |

(52) U.S. Cl.
CPC ... *H04L 43/0876* (2013.01); *G06Q 10/06375* (2013.01); *G06Q 30/0202* (2013.01); *H04W 24/08* (2013.01)

(58) Field of Classification Search
CPC .. G06Q 30/20; G06Q 30/202; G06Q 10/6375; G06Q 30/02; G06Q 30/0202; G06Q 10/06375; H04W 24/00; H04W 24/08; H04L 43/0876

See application file for complete search history.

(56) References Cited

U.S. PATENT DOCUMENTS

| | | | |
|---|---|---|---|
| 7,796,619 B1 | 9/2010 | Feldmann et al. | |
| 8,185,608 B1 * | 5/2012 | York et al. | G06Q 30/02 709/203 |
| 8,505,057 B2 | 8/2013 | Rogers | |
| 8,571,916 B1 * | 10/2013 | Bruce et al. | G06Q 30/0242 705/7.11 |
| 2006/0187851 A1 * | 8/2006 | Waldorf et al. | H04M 3/2236 370/252 |
| 2007/0183339 A1 * | 8/2007 | Rousell et al. | H04M 15/00 370/252 |
| 2007/0265907 A1 * | 11/2007 | Adduci et al. | G06Q 10/06 705/36 R |

OTHER PUBLICATIONS

Customer Self-Service Systems: The Effects of Perceived Web Quality With Service Contents on Enjoyment, Anxiety, and E-Trust Yujong Hwang, Dan J. Kim pp. 746-760 Available online at www.sciencedirect.com.

Quality-of-Service Mapping Mechanism for Packet Video in Differentiated Service Network Shin, Kim, Kuo Integrated Media Systems Center and Department of Electrical Engineering-Systems, University of Southern California pp. 1-17.

* cited by examiner

*Primary Examiner* — Larry Donaghue

(74) *Attorney, Agent, or Firm* — McDermott Will & Emery LLP

(57) ABSTRACT

Aspects and implementations of the present disclosure are directed to methods of and systems for estimating latent demand with user prioritization. The estimated latent demand may be used to identify potential increases in usage of a networked computer service that could be realized by provisioning additional resources. A sub-set of the user base is provided a communication quality of service enhancement simulating provisioning of additional resources. Estimated latent usage demand is then determined by comparing the networked computer service usage by the user base receiving the enhancement with usage by a user base not receiving the enhancement.

27 Claims, 6 Drawing Sheets

ESTIMATING LATENT DEMAND WITH USER PRIORITIZATION

BACKGROUND

Information networks, e.g. the Internet (or more particularly the World Wide Web hosted thereon), facilitate delivery of content from content providers to content recipients. A publisher may provide content for display at a client device, e.g., on a web page or as streaming media. Presentation of the content may include text, video, audio, an interactive element, and/or any combination thereof. The presentation may include content from multiple content providers. A person viewing a web page rendered by a client device may see content from multiple providers in a single web page or during a single web browsing session.

Generally, a person viewing content experiences some amount of delay between when the content is requested and when viewing begins. The delay can be caused by many different factors such as delays in processing a content request at a content host server, constraints in a communication channel, and rendering delays at the client device. If the delay is sufficiently bad, users may curtail a viewing session. Generally, a content provider can provision resource improvements to reduce the delay, e.g., by adding additional host servers or enhancing communication channels. However, the content provider needs to provision the right resource improvements. Users may also curtail a viewing session for reasons other than delay, e.g., a lack of desirable content. In such situations, a content provider may prefer to invest in better content instead of investing in better infrastructure.

SUMMARY

Aspects and implementations of the present disclosure are directed to methods of and systems for estimating latent demand with user prioritization. The estimated latent demand may be used to identify potential increases in usage of a networked computer service that could be realized by provisioning additional resources. A sub-set of the user base is provided a communication quality of service enhancement simulating provisioning of additional resources. Estimated latent usage demand is then determined by comparing the networked computer service usage by the user base receiving the enhancement with usage by a user base not receiving the enhancement.

In one aspect, the disclosure relates to a method of estimating latent computing resource demand. The method includes collecting, by a data analyzer, interaction data for interactions between a networked computer service and a plurality of client devices communicating with the networked computer service. The plurality of client devices includes at least a first set of client devices randomly selected from a population of client devices communicating with the networked computer service, wherein communications between the networked computer service and the client devices in the first set receive a first communication quality of service enhancement and a second set of client devices randomly selected from the population of client devices communicating with the networked computer service not in the first set of client devices, wherein communications between the networked computer service and the client devices in the second set do not receive the first communication quality of service enhancement. The method includes identifying, by the data analyzer, a first usage level represented by the interaction data collected for the first set of client devices and identifying, by the data analyzer, a second usage level represented by the interaction data collected for the second set of client devices. The method includes determining, by the data analyzer, an estimated latent computing resource demand based on a comparison of the first usage level to the second usage level.

In some implementations of the method, each communication between the networked computer service and a client device in the population of client devices comprises one or more data packets flowing through a data network and the first communication quality of service enhancement comprises prioritizing the one or more data packets within the data network. In some implementations of the method, collecting interaction data by the data analyzer comprises parsing one or more server transaction logs.

In some implementations, the method includes dynamically selecting a client device for inclusion in one of the first set of client devices and the second set of client devices based on a function of an anonymous identifier randomly assigned to the client device. In some implementations of the method, the population of client devices is a sub-set of all client devices communicating with the networked computer service and the population of client devices has at least one characteristic in common. In some implementations, the at least one characteristic in common is one of: a data network accessed by each client device in the population of client devices; a client device type for each client device in the population of client devices; a geographic location for each client device in the population of client devices; and/or an Internet service provider used by each client device in the population of client devices.

In some implementations of the method, the population of client devices communicate with the networked computer service via a plurality of data networks and the method includes determining, by the data analyzer, that an estimated latent computing resource demand in a first network of the plurality of data networks is greater than an estimated latent computing resource demand in a second network of the plurality of data networks. In some implementations of the method, the networked computer service is provided by a plurality of computer servers and the first communication quality of service enhancement is, for a request from a client device to a first computer server in the plurality of servers, to redirect the request to a second computer server with a higher availability than the first computer server.

In some implementations, the method includes generating, by the data analyzer, a predicted revenue potential for the networked computer service based on the estimated latent computing resource demand. In some implementations, the predicted revenue potential is based on an infrastructure upgrade providing a second service enhancement different from the first communication quality of service enhancement.

In one aspect, the disclosure relates to a system for estimating latent computing resource demand, the system comprising a network interface and one or more processors communicatively coupled with the network interface. The one or more processors are configured to collect interaction data for interactions between a networked computer service and a plurality of client devices communicating with the networked computer service. The plurality of client devices includes at least a first set of client devices randomly selected from a population of client devices communicating with the networked computer service, wherein communications between the networked computer service and the client devices in the first set receive a first communication quality of service enhancement and a second set of client devices randomly selected from the population of client devices communicating with the networked computer service not in the first set of client devices, wherein communications between the networked computer service and the client devices in the second set do not receive the first communication quality of service enhancement. The one or more processors are configured to identify a first usage level represented by the interaction data collected for the first set of client devices and identify a second usage level represented by the interaction data collected for the second set of client devices. The one or more processors are configured to determine an estimated latent computing resource demand based on a comparison of the first usage level to the second usage level.

In some implementations of the system, each communication between the networked computer service and a client device in the population of client devices comprises one or more data packets flowing through a data network and the first communication quality of service enhancement comprises prioritizing the one or more data packets within the data network. In some implementations of the system, the one or more processors are configured to collect interaction data by parsing one or more server transaction logs.

In some implementations, the one or more processors are configured to dynamically select a client device for inclusion in one of the first set of client devices and the second set of client devices based on a function of an anonymous identifier randomly assigned to the client device. In some implementations of the system, the population of client devices is a sub-set of all client devices communicating with the networked computer service and the population of client devices has at least one characteristic in common. In some implementations, the at least one characteristic in common is one of: a data network accessed by each client device in the population of client devices; a client device type for each client device in the population of client devices; a geographic location for each client device in the population of client devices; and/or an Internet service provider used by each client device in the population of client devices.

In some implementations of the system, the population of client devices communicate with the networked computer service via a plurality of data networks and the one or more processors are configured to determine that an estimated latent computing resource demand in a first network of the plurality of data networks is greater than an estimated latent computing resource demand in a second network of the plurality of data networks. In some implementations, the networked computer service is provided by a plurality of computer servers and the first communication quality of service enhancement is, for a request from a client device to a first computer server in the plurality of servers, to redirect the request to a second computer server with a higher availability than the first computer server.

In some implementations, the one or more processors are configured to generate a predicted revenue potential for the networked computer service based on the estimated latent computing resource demand. In some implementations, the predicted revenue potential is based on an infrastructure upgrade providing a second service enhancement different from the first communication quality of service enhancement.

In one aspect, the disclosure relates to tangible computer readable storage media storing non-transient processor-executable instructions that, when executed by a computing device comprising the storage media and one or more processors, cause the one or more processors to estimate latent computing resource demand. The instructions cause the one or more processors to collect interaction data for interactions between a networked computer service and a plurality of client devices communicating with the networked computer service. The plurality of client devices includes at least a first set of client devices randomly selected from a population of client devices communicating with the networked computer service, wherein communications between the networked computer service and the client devices in the first set receive a first communication quality of service enhancement and a second set of client devices randomly selected from the population of client devices communicating with the networked computer service not in the first set of client devices, wherein communications between the networked computer service and the client devices in the second set do not receive the first communication quality of service enhancement. The instructions cause the one or more processors to identify a first usage level represented by the interaction data collected for the first set of client devices and identify a second usage level represented by the interaction data collected for the second set of client devices. The instructions cause the one or more processors to determine an estimated latent computing resource demand based on a comparison of the first usage level to the second usage level.

In some implementations of the storage media, each communication between the networked computer service and a client device in the population of client devices comprises one or more data packets flowing through a data network and the first communication quality of service enhancement comprises prioritizing the one or more data packets within the data network. In some implementations of the storage media, the instructions cause the one or more processors to collect interaction data by parsing one or more server transaction logs.

In some implementations, the instructions cause the one or more processors to dynamically select a client device for inclusion in one of the first set of client devices and the second set of client devices based on a function of an anonymous identifier randomly assigned to the client device. In some implementations of the system, the population of client devices is a sub-set of all client devices communicating with the networked computer service and the population of client devices has at least one characteristic in common. In some implementations, the at least one characteristic in common is one of: a data network accessed by each client device in the population of client devices; a client device type for each client device in the population of client devices; a geographic location for each client device in the population of client devices; and/or an Internet service provider used by each client device in the population of client devices.

In some implementations of the storage media, the population of client devices communicate with the networked computer service via a plurality of data networks and the instructions cause the one or more processors to determine that an estimated latent computing resource demand in a first network of the plurality of data networks is greater than an estimated latent computing resource demand in a second network of the plurality of data networks. In some implementations, the networked computer service is provided by a plurality of computer servers and the first communication quality of service enhancement is, for a request from a client device to a first computer server in the plurality of servers, to redirect the request to a second computer server with a higher availability than the first computer server.

In some implementations, the instructions cause the one or more processors to generate a predicted revenue potential for the networked computer service based on the estimated latent computing resource demand. In some implementations, the predicted revenue potential is based on an infrastructure upgrade providing a second service enhancement different from the first communication quality of service enhancement.

BRIEF DESCRIPTION OF THE DRAWINGS

The above and related objects, features, and advantages of the present disclosure will be more fully understood by reference to the following detailed description, when taken in conjunction with the following figures, wherein.

Like reference numbers and designations in the various drawings indicate like elements.

DETAILED DESCRIPTION

Implementations described herein generally relate to methods and systems for estimating latent demand by providing some users with prioritized service. Generally, users access a content delivery service with an interest in receiving content. Users exhibit demand by requesting content. However, the exhibited demand may be less than the actual demand, which is the actual amount of content the users are interested in consuming if content reception and presentation conditions were ideal. Users may be interested in consuming more content if the quality of the content (QoC) was improved or if the quality of the experience (QoE) with delivery of the content was improved. The user interest in receiving more content, the unrealized demand, is referred to as the latent demand. A content provider using the methods and systems disclosed can estimate latent demand attributable to the QoE (separated from QoC) and identify areas for improvement.

In general, a user requests content from a content delivery service using a client device and the content is provided by a content server to the client device, via a network, for presentation to the user. The implementations described may be applied to any type of content that can be delivered via a network. Some implementations are tailored to, or may be more useful for, particular types of content. For example, some of the implementations described relate to content delivery services for streaming media content. The disclosure, however, is not limited to these types of content and the teachings can be applied to other types of content as well.

Figure 1:
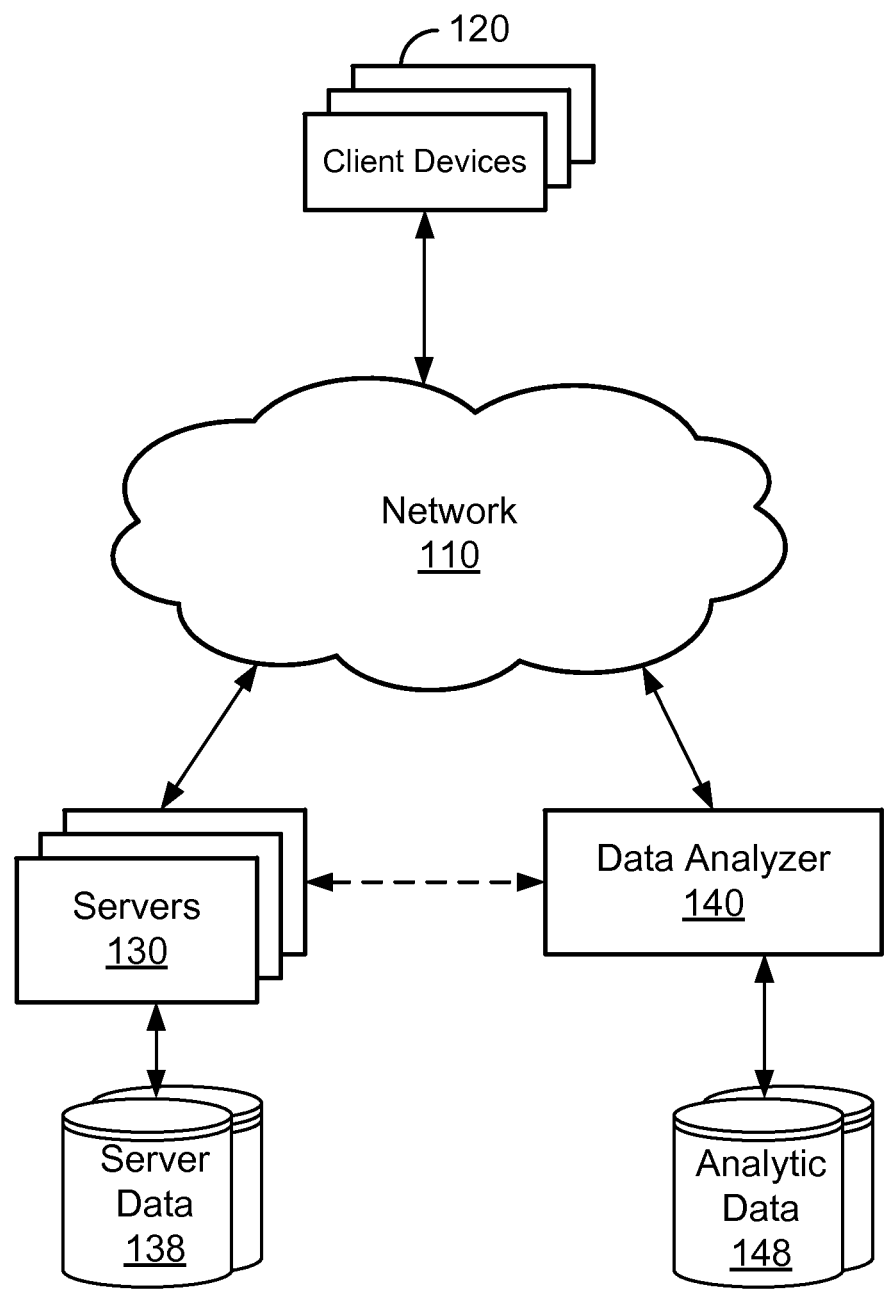
FIG. 1 is a block diagram of an implementation of a system for estimating latent demand.

FIG. 1 is a block diagram of an implementation of a system for estimating latent demand. Client devices 120 interact with servers 130 via a network 110. The servers 130 use server data stored in data storage devices 138 to provide content to the client devices 120. A data analyzer 140 records and uses analytic data stored in data storage devices 148 to estimate latent demand for the content.

The network 110 is a network facilitating the interactions between computing devices, e.g., between the client devices 120 and the servers 130. An illustrative network 110 is the Internet; however, other networks may be used. The network 110 may be composed of multiple connected sub-networks. The network 110 can be a local-area network (LAN), such as a company intranet, a metropolitan area network (MAN), a wide area network (WAN), an inter-network such as the Internet, or a peer-to-peer network, e.g., an ad hoc WiFi peer-to-peer network. The network 110 may be any type and/or form of data network and/or communication network. The network 110 may be public, private, or a combination of public and private networks. The topology of the network 110 may be any network topology capable of the operations described herein. The network 110 is used to convey information between a server 130 and a client device 120.

A client device 120 is capable of exchanging information via the network 110. A client device 120 may be a computing device or software executing on a computing device. Generally, and without limitation, a client device 120 is capable of presenting content to a user or facilitating presentation of content to a user. A user may operate a client device 120 to interact with various data servers 130 via the network 110. As an illustrative example, a user may request one or more content items from a server 130 using a client device 120, such that each request is received by a server 130 and the requested content is delivered from one or more servers 130 via the network 110 to the client device 120, where it is rendered for presentation to the user. A user may interact with the servers 130 in this manner, such that a set of requests, responses, and subsequent requests may form a session. For example, a user may use a client device 120 to visit a media streaming web site and request a first content item (e.g., a video), the user may receive the content item (i.e., watch the video streamed from servers 130) and then request a second content item. The user's session continues until the user stops requesting content items. In some implementations, the session is kept alive for a fixed period of time after delivery of the last content item, providing the user time to engage the content and make a subsequent request. In some implementations, the web page delivered to the client device 120 is configured to periodically make requests to a server 130 to keep the session alive until the page is closed or navigated away from. In some implementations, a session is a logical grouping of requests from a client device 120 over a period of time.

In some implementations, each client device 120 has an identifier that may be used to distinguish between various client devices. The identifier may be unique. In some implementations, an IP address is used as an identifier. In some implementations, a user supplies information used to identify a client device 120. In some implementations, an identifier is provided to a client device 120 and stored at the client device, e.g., as a cookie. When a client device 120 interacts with a server 130, the client device 120 may provide the server 130 with the stored identifier. In some implementations, the identifier provided for storage at the client is an arbitrary or randomly selected number or character string. In some implementations, a server maintains a sequence number; for each first interaction with a client device, the server sends the sequence number to the newly encountered client device as an identifier and then increases the sequence number by some fixed or dynamic amount. In some implementations, the identifier provided for storage at the client is a function of the date and time of a first interaction between the client and the server. In some implementations, the identifier provided for storage at the client has no meaning other than that it is uniquely assigned to a particular instance of a client device such that the identification in no way identifies, or is associated with, a user's personal identity, online or offline.

Illustrative examples of client devices 120 include, but are not limited to, a laptop, desktop, tablet, electronic pad, personal digital assistant, smart phone, video game device, television, kiosk, or portable computer. A computing device 900 that may be used as a client device is described in further detail below, in relation to FIG. 6.

A server 130 is capable of exchanging information via the network 110. A server 130 may be a computing device or software executing on a computing device. A server 130 may be a virtual server, e.g., a server hosted by a third-party cloud services provider. A server 130 may operate independently or collaboratively with other servers 130. A server 130 may access data, e.g., content items, stored by one or more storage devices 138. In some implementations, a server 130 assigns an identifier, e.g., as described above, to each client device 120 with which it interacts. The identifier is provided to a client device 120 during a first interaction and the client device 120 returns it during each subsequent interaction. In some implementations, a server 130 records, e.g., as server data in a data storage system 138, information for distinguishing between client devices. In some implementations, a server 130 records interaction data in a data storage system 138. The interaction data may include identifying information for a client device, e.g., an IP address, and information about an interaction, e.g., length of the interaction, number and/or details of requests received from the client device, time of the requests, content items sent to the client device, details about delivery of content (e.g., success of delivery, length of time for delivery, size of content delivered, bit rate for the delivery), quality metrics for the interaction (e.g., size of buffers used or number of retries required) and any other information relevant to the interactions. A computing device 900 that may be used as a server is described in further detail below, in relation to FIG. 6.

A data analyzer 140 measures demand. In some implementations, one or more of the servers 130 act as a data analyzer 140. In some implementations, the data analyzer 140 is a separate server communicatively connected to the network 110 or to one or more servers 130. The data analyzer 140 records analytic data in a data storage system 148. Generally, the data analyzer 140 reviews interactions between the client devices 120 and the servers 130 to identify usage levels and estimate latent demand. In some implementations, the data analyzer 140 collects data and generates analysis in real time, or substantially concurrently with usage of the servers 130. In some implementations, the data analyzer 140 collects data from the servers 130 at a time removed from the usage analyzed. For example, in some implementations, the data analyzer 140 collects interaction logs from the servers 130 on a periodic basis. A computing device 900 that may be used as a data analyzer is described in further detail below, in relation to FIG. 6.

As described above, the servers 130 access data stored by one or more storage systems 138 and the data analyzer 140 accesses data stored by one or more storage systems 148. Data storage systems may incorporate one or more mass storage devices for storing data, e.g., magnetic, magneto optical disks, or optical disks. Devices suitable for storing data include all forms of non-volatile memory, media and memory devices, including by way of example semiconductor memory devices, e.g., EPROM, EEPROM, and flash memory devices, magnetic disks, e.g., internal hard disks or removable disks, magneto optical disks, and CD ROM, DVD-ROM, and Blu Ray disks. Data storage systems may be virtualized. Data storage systems may be accessed by servers 130 or analyzers 140 via an intermediary server and/or via a network 110. Data storage systems may structure data as a database, e.g., as a relational database. Data storage systems may structure data as a collection of files, data blocks, or chunks. Data storage systems may provide for error recovery using, for example, redundant storage devices and/or error recovery data (e.g., parity bits).

Figure 2A:
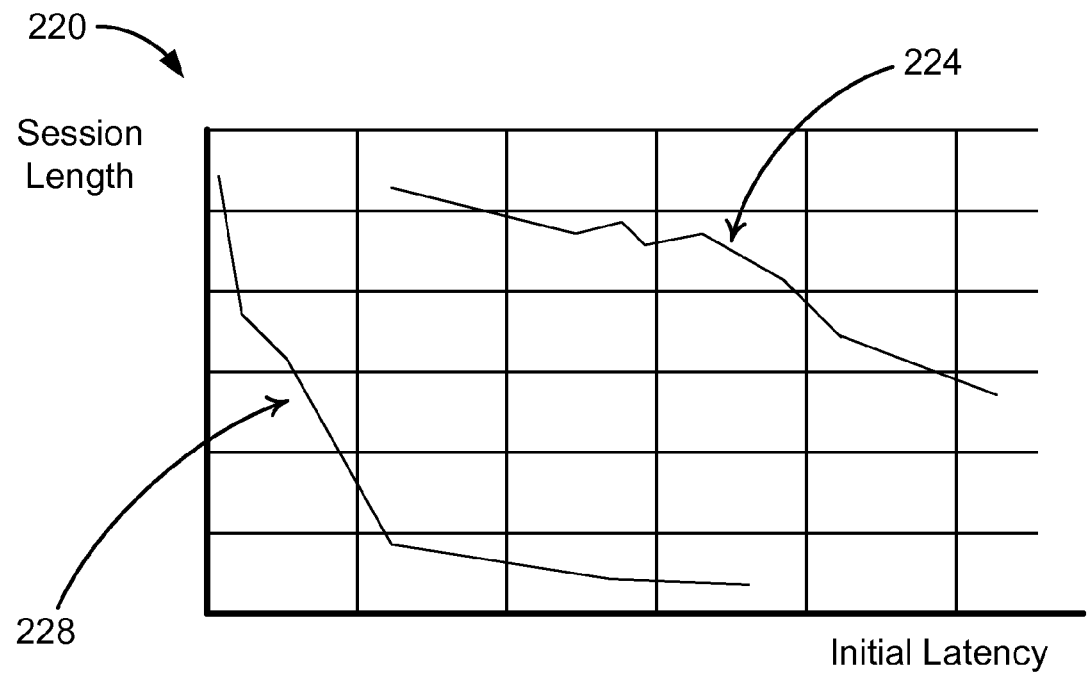
FIGS. 2A and 2B are charts illustrating usage demand.
Figure 2B:
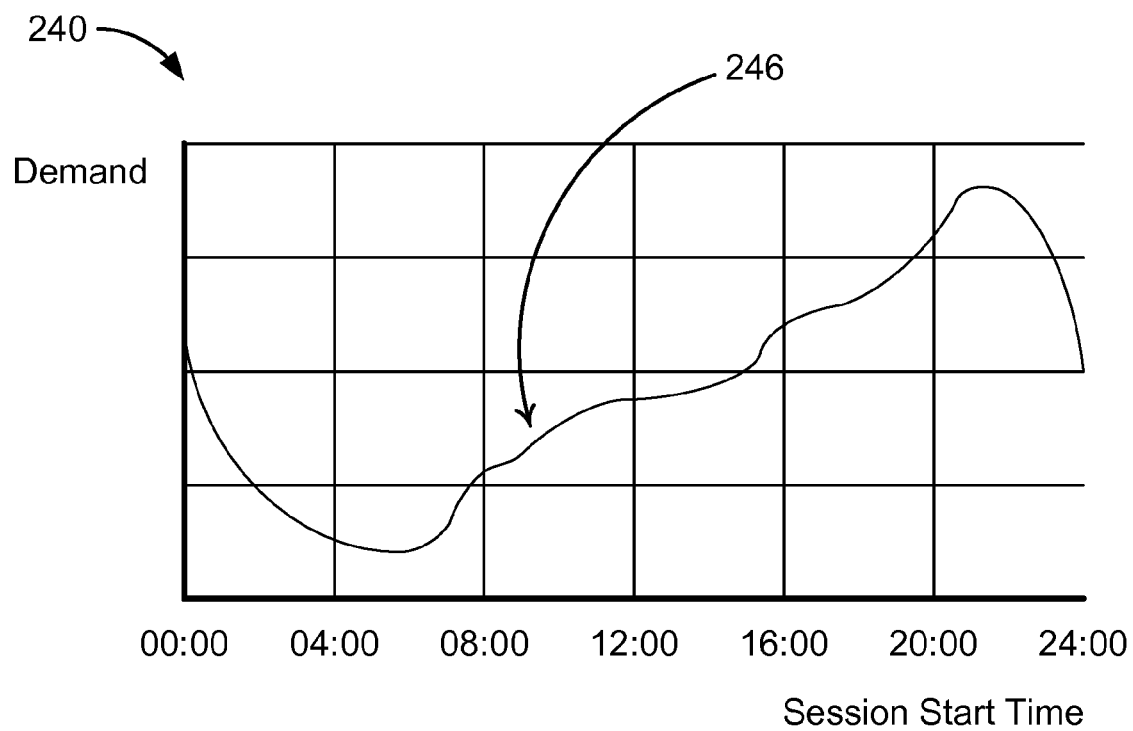

FIGS. 2A and 2B are charts illustrating user behavior of content delivery services. In general, these charts provide context for methods and systems of identifying and analyzing changes in user behavior. FIG. 2A is a chart 220 illustrating tolerances for latency by different user groups. FIG. 2B is a chart 240 illustrating usage demand by time of day. The lines 224, 228, and 246, plotted in the respective charts 220 and 240 are meant as examples and are not tied to any specific data.

FIG. 2A is a chart illustrating tolerances for latency by different user groups. The chart 220 has a vertical axis for session length and a horizontal axis for initial latency. Each point in the chart indicates how long a user accessed a content server as a function of delays the user initially encountered. The chart 220 includes a line 224 for a first group of users and a line 228 for a second group of users. The line 224 for the first group of users illustrates that some users may continue to use the service extensively even when confronted with severe delays. The line 228 for the second group of users illustrates that some users quickly curtail sessions when confronted with moderate delays.

FIG. 2B is a chart illustrating usage demand by time of day. The chart 240 has a vertical axis for measured demand and a horizontal axis for session start time. A curve 246 is plotted on the chart 240 illustrating a typical demand level as a function of session start time. Generally, demand on a content delivery server 130 fluctuates over the course of a day. There is a hypothesis that if demand were limited only by the capability of the server to satisfy requests, the curve 246 should flatten as the server 130 reaches its limit. That is, if the server could only satisfy N concurrent requests, the curve 246 would plateau at a level indicating N requests. However, generally, the number of concurrent requests that a server can handle is not fixed. A content delivery service under heavy load may reduce the quality of responses or take longer to process requests. Thus, rather than reject a request that pushes the service's limits, a server under load might degrade or delay responses to requests, resulting in a reduced quality of experience (QoE) for users. In response, as illustrated in FIGS. 2A and 2B, dissatisfied users may submit fewer requests or stop placing requests. Thus the curve 246 does not flatten, likely because the server never quite reaches full capacity. Experiments have shown that increasing server throughput merely increases the demand satisfied; that is, all points on the curve 246 are vertically higher on the chart 240. This suggests that simply improving server throughput across a system does not necessarily reveal the latent demand.

Generally, users will extend session lengths if provided less latency and thus an improved quality of experience (QoE). The extended session length typically has value to the service provider. It is helpful to identify if the additional session length has sufficient value to warrant the expense of provided the improved QoE. For example, referring to FIG. 2A, the line 228 illustrates session lengths for the second group of users quickly tapering off as compared to the line 224 illustrating session lengths for the first group of users. Therefore, assuming the cost of reducing latency is the same for both groups of users, it may be more worthwhile to improve QoE for the second group of users. It is helpful, in this analysis, to have an estimate for how much demand will increase if the QoE is improved.

Figure 3:
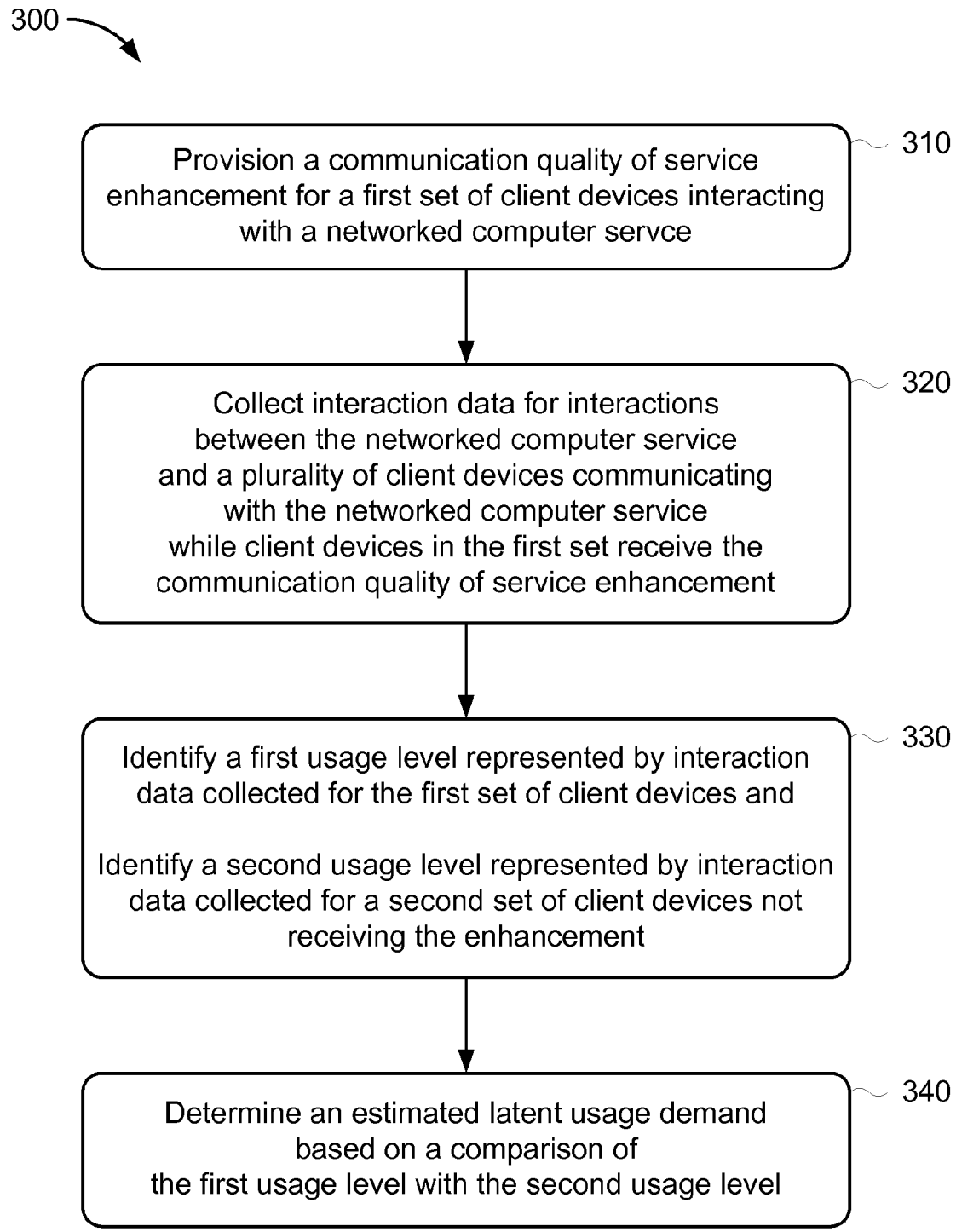
FIG. 3 is a flowchart for determining an estimated latent usage demand.

FIG. 3 is a flowchart of a method for determining an estimated latent usage demand. In broad overview, the method 300 includes provisioning a communication quality of service enhancement for a first set of client devices interacting with a networked computer service (step 310) and collecting, by a data analyzer, interaction data for interactions between the networked computer service and a plurality of client devices communicating with the networked computer service while some of the devices in the plurality receive the communication quality of service enhancement (step 320). The method includes identifying, by the data analyzer, a first usage level represented by interaction data collected for the first set of client devices receiving the communication quality of service enhancement and identifying a second usage level represented by interaction data collected for a second set of client devices not receiving the communication quality of service enhancement (step 330). The method includes determining, by the data analyzer, an estimated latent usage demand based on a comparison of the first usage level with the second usage level (step 340).

As indicated above, the method 300 includes provisioning a communication quality of service enhancement for a first set of client devices interacting with a networked computer service (step 310). In some implementations, referring to FIG. 1, a data analyzer 140 provisions the communication quality of service enhancement. In some implementations, the data analyzer 140 administers provisioning of the communication quality of service enhancement. Generally, the communication quality of service enhancement simulates additional service or network infrastructure. The enhancement typically prioritizes the first set of client devices over other client devices that may be interacting with the networked computer service. When the service (or service network) is below capacity, the enhancement may be inconsequential. When the service (or service network) is under heavy load and at or near capacity, the client devices not in the first set of client devices will generally be impacted first or more severely. Communication quality of service enhancements are described in more detail below.

The method 300 includes collecting, by a data analyzer, interaction data for interactions between the networked computer service and a plurality of client devices communicating with the networked computer service while some of the devices in the plurality receive the communication quality of service enhancement (step 320). For example, referring to FIG. 1, a data analyzer 140 may collect interaction data for interactions between various client devices 120 and the servers 130 providing a networked computer service while some of the client devices 120 receive the communication quality of service enhancement provisioned in step 310 and some of the client devices 120 do not receive the enhancement. That is, the plurality of client devices includes at least some client devices in the first set of client devices receiving the communication quality of service enhancement and at least some devices in a second set of client devices not receiving the communication quality of service enhancement.

To collect the interaction data, in some implementations, the data analyzer 140 parses one or more server transaction logs. For example, each server 130 may record a transaction log indicating each request received and processed. The log may be recorded, for example, in a data storage system 138. The log may indicate where and when each request originated. The log may indicate how and when each request was resolved. The log may include information for content items sent to client devices, including, e.g., what content items were sent, when the server began sending each content item, and how long it took to send each content item. In some implementations, the data analyzer records analytic information as client devices 120 interact with the servers 130.

The method 300 includes identifying, by the data analyzer 140, a first usage level represented by interaction data collected for the first set of client devices receiving a communication quality of service enhancement and identifies a second usage level represented by interaction data collected for the second set of client devices not receiving the communication quality of service enhancement (step 330). Generally, the usage level is one or more values representing the average demand on a networked computer service from client devices in a particular set of client devices perceiving a Quality of Experience (QoE) during a particular time interval. The one or more values comprising a usage level are derived from metrics, e.g., usage metrics and/or QoE metrics. The QoE metrics provide context for the measured usage.

Usage metrics demonstrate demand on the networked computer service. Examples of usage metrics include an average number of requests (per client device) received during a measured time interval, an average amount of data requested (per client device) during a measured time interval, and an average session length for sessions during the measured time interval. A usage level places one or more of these metrics in the context of how well the networked computer service satisfied the demand.

Quality of Experience (QoE) metrics measure how the client devices perceive the networked computer service's ability to respond to requests. Examples of QoE metrics include a number of content items delivered during the time interval, a quantity of data delivered (e.g., megabytes sent) during the time interval, and an average (mean) bit-rate for data sent during the time interval. In some implementations, the identified usage level is a combination of usage metrics and QoE metrics.

The metrics may be tailored to the particular type of service, e.g., a content delivery service. In an implementation for a networked computer service hosting content items, the metrics may include one or more of a number of content items requested during the time interval, a number of content items delivered during the time interval, a quantity of data delivered (e.g., megabytes sent) during the time interval, and an average (mean) bit-rate for data sent during the time interval. In some implementations, metrics are grouped by qualifiers such as client device's ISP, geographic region, or country. In some implementations, market statistics are identified such as client devices with subscriptions to the service, growth in subscriptions, revenue generated, and market share.

In some implementations, the networked computer service streams media content items, e.g., audio, video, or other multimedia. Generally, media content may be streamed to a client device 120 and presented by the client device 120 to a user. In some implementations, the stream may be buffered at the client device for smooth presentation. In some implementations, the media quality (e.g., compression level, frame size, or resolution) may be adjusted during presentation. In an implementation for a networked computer service streaming media content items, usage and QoE metrics may include one or more of a number of streaming events during a time interval, statistics for concurrent streaming events (e.g., minimum, maximum, and average number of concurrent streams during the time interval), total length (in time)

of the media delivered (sometimes called "watch hours") over the course of the time interval, number of buffering events during the time interval, number of re-buffering events during the time interval (wherein presentation of the media stream at the client device 120 is delayed mid-presentation while the client device 120 waits for a playback buffer to contain sufficient data to resume presentation), average (mean) time between re-buffering events during the time interval, average media quality sent during the time interval, number or percentage of streams where media quality changed during the time interval, and number or percentage of streams where media quality fell below a minimum threshold (e.g., percentage of streams that failed to maintain a resolution of at least 480p, sometimes called "goodput percentage") during the time interval.

The data analyzer 140 may identify the first usage level by determining an average or median session length represented by interaction data collected for the first set of client devices receiving a communication quality of service enhancement during a time interval. The data analyzer 140 may identify the first usage level by determining a session frequency represented by the interaction data. The data analyzer 140 may identify the second usage level by determining an average or median session length represented by interaction data collected for the second set of client devices not receiving a communication quality of service enhancement. The data analyzer 140 may identify the second usage level by determining a session frequency represented by the interaction data.

The method 300 includes determining, by the data analyzer 140, an estimated latent usage demand based on a comparison of the first usage level with the second usage level (step 340). In some implementations, the estimated latent usage demand is the difference between the first usage level and the second usage level. The usage level may be comprised of values for multiple metrics, as described above. The analysis may comprise, for example, calculating a first average session length for client devices perceiving a QoE including an average bit-rate above a rate threshold and an average number of rebuffering events below an error threshold and calculating a second average session length for client devices perceiving a QoE including an average bit-rate below the rate threshold and an average number of rebuffering events above an error threshold. If the first average session length is similar to the second average session length, then it is unlikely that the QoE had an impact on usage behavior. If the first average session length is higher than the second average session length, then the difference between the two averages is a measure of latent demand—users of the client devices in the second group would probably have requested more content if the QoE had been better.

How the communication quality of service enhancement is provisioned (at step 310) impacts what the resulting analysis (at step 340) indicates. The method 300 can uncover network hotspots where additional resources could be committed to provide all client devices with a QoE comparable to the QoE the first sub-set received through the communication quality of service enhancement. That is, the enhancement simulates, for some client devices, a service quality that could be provided to all of the client devices (without the enhancement) by improving the network and server resources. Additionally, estimated latent demand can be determined for multiple groups of client devices. Differences in latent demand between the different groups can be used to identify or prioritize different network resources that could be improved or upgraded.

Figure 4:
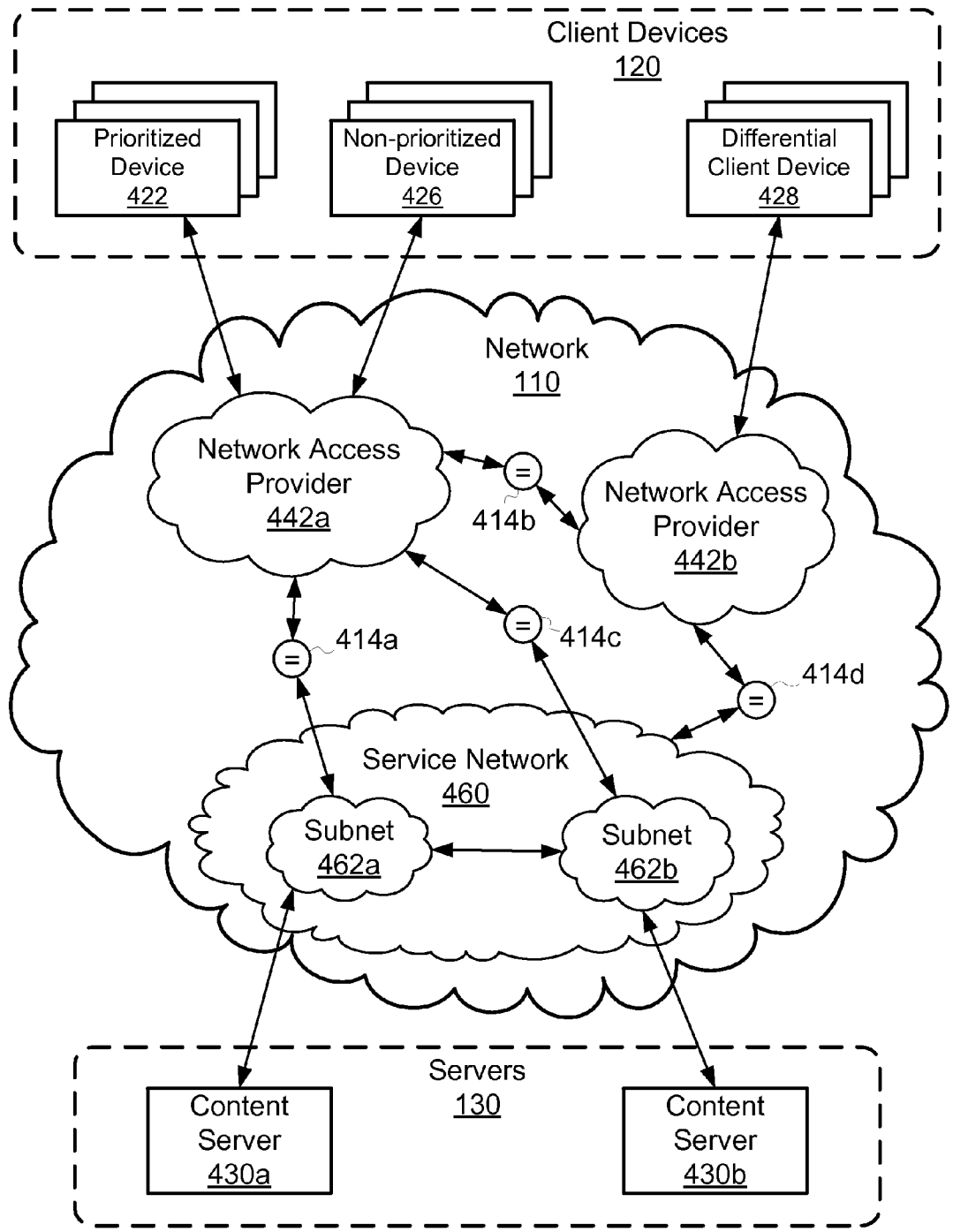
FIG. 4 is a block diagram illustrating paths in a network.
Figure 5:
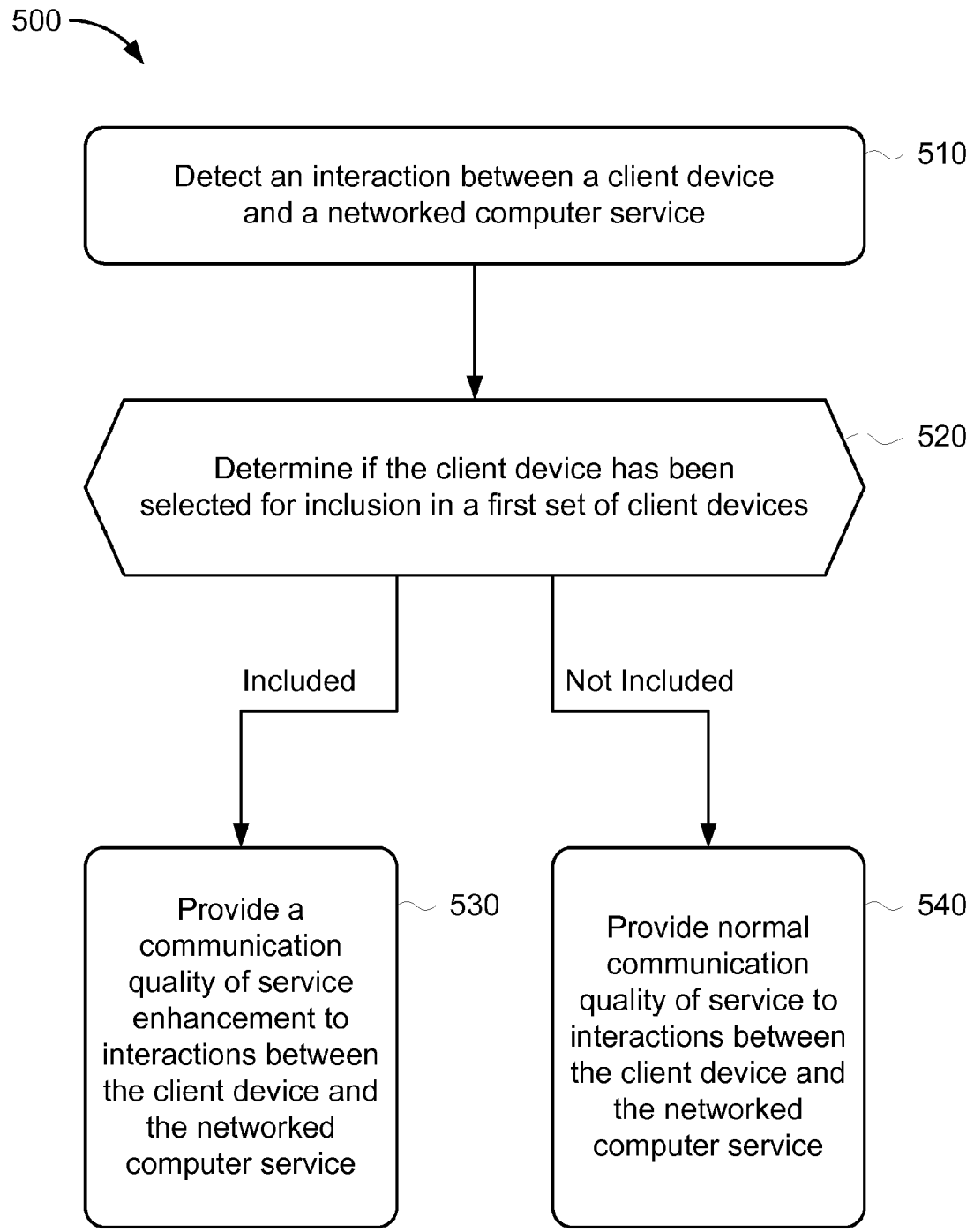
FIG. 5 is a flowchart for determining whether or not to provide a communication quality of service enhancement.

FIGS. 4 and 5 illustrate how the communication quality of service enhancement may be implemented and how the communication quality of service enhancement may be allocated to a sub-set of client devices interacting with the networked computer service.

FIG. 4 is a block diagram illustrating network paths between client devices 120 and servers 130 via the network 110, for use in describing communication quality of service enhancements. In brief over-view, the network 110, as illustrated, includes network access provider networks 442a and 442b and a service network 460 (generally referred to as "networks"). Networks 442a, 442b, and 460 connect at peering points 414a-414d (generally "peering point 414"). The network 110 connects servers 130 providing a content delivery service to the client devices 120, illustrated as prioritized client devices 422, non-prioritized client devices 426, and other differential client devices 428. The illustrated servers 130 include a content server 430a connected to a first subnet 462a of the service network 460 and another content server 430b connected to a second subnet 462b of the service network 460.

In more detail, FIG. 4 illustrates various communication paths between the client devices 120 and the content servers 430a and 430b, which provide a content delivery service. The communication quality of service enhancements are generally implemented by the content service provider, at the servers 130 and/or in the service network 460. The service provider may also be able to influence routes through third-party networks, such as the network access provider networks 442a and 442b, e.g., through selection of which peering point 414 to use for a communication flow. Three groups of client devices 120 are shown to illustrate some of the possible routes and communication quality of service enhancements.

The client devices 120 illustrated in FIG. 4 include prioritized client devices 422 selected to receive a communication quality of service enhancement for interactions with a service provided by the servers 130. Selection of client devices to receive (or to not receive) the communication quality of service enhancement is described in more detail below, in reference to FIG. 5. In some implementations, each prioritized client device 422 is selected in a random or arbitrary manner. Generally, once selected to receive the communication quality of service enhancement, a prioritized client device 422 will receive the enhancement for every session over a period of time. In some implementations, the period of time is open ended. In some implementations, the period of time ends on a predetermined date, after a fixed number of hours, days, or months, or at a time selected by an administrator after the client device has begun receiving the enhancement.

The client devices 120 illustrated in FIG. 4 also include a group of non-prioritized client devices 426 not selected to receive the communication quality of service enhancement. Generally, the prioritized client devices 422 and the non-prioritized client devices 426 have some similarities. This allows for comparative analysis of interactions between the servers 130 and the prioritized client devices 422 with interactions between the servers 130 and the non-prioritized client devices 426. For example, the client devices 422 and 426 may use the same network access provider network 442a, as illustrated, suggesting some geographic or demographic similarity. In some implementations, users of the client devices 422 and 426 are interested in the same or similar content items such that quality of content (QoC) is a constant.

The client devices 120 illustrated in FIG. 4 also include a group of differential client devices 428 connected to the network 110 via a different network access provider network 442b. That is, the population of client devices 422 and 426 for which analysis is conducted may be only a sub-set of all client devices 120 interacting with the servers 130. In some implementations, these differential client devices 428 are excluded from the analysis described herein. However, in some implementations, data for interactions between these other client devices 428 and the servers 130 is used in the analysis described herein. This allows for comparative analysis of interactions between the servers 130 and the prioritized client devices 422 with interactions between the servers 130 and the differential client devices 428. For example, the client devices 422 and 428 may use different network access provider networks 442a and 442b, as illustrated, suggesting some geographic or demographic differences. As appropriate, these differential client devices 428 may receive the communication quality of service enhancement or they may not receive the communication quality of service enhancement.

The network access provider networks 442a and 442b, connect the client devices 120 to the broader network 110. The network 110 connects the access provider networks 442a and 442b to the service network 460. Thus the client devices 120 can communicate, via the network 110, with the servers 130 providing the content delivery service. In some implementations, a network access provider is an Internet Service Provider (ISP). A single ISP can maintain multiple network access provider networks 442a and 442b. For example, an ISP can have a provider network 442a for a city or metropolitan region and a second provider network 442b for another city or metropolitan region somewhere else. The two networks may be connected by one or more peering points 414 (e.g., peering point 414b), or may be connected by intermediary third-party networks. Communication between a network access provider network 442a and the service network 460 may traverse a third-party network, e.g., another network access provider's network 442b.

Each peering point 414 is a physical location at which two networks connect. Two networks may connect at multiple peering points. For example, FIG. 4 illustrates a network access provider 442a connected to the service network 460 via two peering points 414a and 414c. Peering points 414a and 414c are typically at different physical locations, providing additional bandwidth and redundancy.

The servers 130 access the network 110 via a service network 460. In some implementations, the service network 460 is an Internet Service Provider (ISP) network. In some implementations, the service network 460 is a network provided by a third-party, e.g., a cloud server provider. In some implementations, the servers 130 and the service network 460 are under unified control, e.g., a content delivery network. The service network 460 may be divided into sub-networks, e.g., the subnets 462a and 462b illustrated in FIG. 4. Servers 130 may be distributed throughout the service network 460, e.g., a first server 430a may be in a first subnet 462a and another server 430b may be in an another subnet 462b. In some implementations, the service network 460 connects to various third-party networks at multiple peering points 414. Thus data can be routed from a server 430a to a prioritized client device 422 through a subnet 462a to a peering point 414a to a network access provider network 442a, where the prioritized client device 422 receives the data.

FIG. 4 illustrates an example network topology in which the content delivery service provider can provide a sub-set of client devices (e.g., the illustrated prioritized devices 422) with a communication quality of service enhancement. The communication quality of service enhancement may improve the quality of service (QoS) received by the prioritized client devices 422 and improve a user's perceived quality of experience (QoE). In some implementations, packets of data are designated to receive the communication quality of service enhancement (e.g., a QoS bit is set in the packet header) and network devices within the service network 460 honor these designations. In some implementations, other mechanisms are used to provide the communication quality of service enhancement.

A communication quality of service enhancement may be provided, for example, by any one or more of: routers and switches in the service network 460 prioritizing data packets addressed to or from the prioritized client devices 422; providing service to the prioritized client devices 422 from an alternate server 430b other than the server(s) 430a the client device would normally interact with; and modifying the route used for interactions with the prioritized client devices 422, e.g., responding to a request received via a first subnet 462a with data sent back to the prioritized client device 422 via a second subnet 462b or responding to a request received via a first network access provider 442a with data sent back to the prioritized client device 422 via a second network access provider 442b. A longer route may be more efficient if part of the route has more bandwidth or if the route is underutilized. In some implementations, requests may be redirected to an alternate server 430b that is a higher performance computing system. In some implementations, requests may be redirected to an alternate server 430b that has a higher throughput and/or a higher availability (e.g., more unused capacity) than a primary server 430a.

Other client devices 426 may not be selected to receive the communication quality of service enhancement. The quality of service (QoS) received by these client devices 426 is an ordinary level of service. In circumstances in which demand is below capacity, prioritized client devices 422 selected to receive the communication quality of service enhancement may have the same QoE as the client devices 426 not selected to receive the communication quality of service enhancement. However, if demand meets or exceeds capacity, the client devices 426 not selected to receive the communication quality of service enhancement will experience more delay and latency than a client device 422 selected to receive the communication quality of service enhancement. The experience for the client devices 422 selected to receive the communication quality of service enhancement simulates using the service as though additional resources had been provisioned.

FIG. 5 is a flowchart of a method for determining whether or not to provide a communication quality of service enhancement. In broad overview, the method includes a server detecting an interaction between a client device and a networked computer service (step 510) and the server determining if the client device has been selected for inclusion in a first set of client devices, which receive a communication quality of service enhancement (step 520). Where the client device is included in the first set of client devices, the method includes providing (e.g., by the server) a communication quality of service enhancement to interactions between the client device and the networked computer service (step 530). Where the client device is not included in the first set of client devices, the method includes providing a normal communication quality of service to interactions between the client device and the networked computer service (step 540).

As indicated above, the method 500 includes detecting, by a server, an interaction between a client device and a networked computer service (step 510). Referring to FIGS. 1 and 4, the client device 120 may be a prioritized client device 422 or a non-prioritized client device 426. In some implementations, the server is an edge server of a content delivery network. In some implementations, the server is a data server 130. In some implementations, the server is a data analyzer 140. In some implementations, the server is a control server. In some implementations, the server receives identifying information from the client device 120. For example, the client device 120 may return a random number previously assigned to it by a server and stored by the client device 120 as a cookie. In some implementations, the server identifies the client device 120 based on routing information, e.g., an IP address for the client device 120.

The method 500 includes determining, by the server, if the client device has been selected for inclusion in a first set of client devices, which receive a communication quality of service enhancement (step 520). That is, referring to FIG. 4, the server determines if the client device 120 is a prioritized device 422. In some implementations, specific client devices are selected for inclusion in the first set of prioritized client devices 422. In some implementations, client devices are included in the first set at random. In some implementations, inclusion in the first set of prioritized client devices 422 is determined as a function of the identifying information identified in step 510. For example, where the client device 120 has been assigned a random number, the client device 120 may be included in the first set of client devices if the random number modulo a denominator equals a preselected number. The denominator may be selected to control the size of the first set of client devices. E.g., a denominator of 100 would cause approximately 1% of the client devices to receive the communication quality of service enhancement, assuming an even distribution of randomly assigned identifiers.

Where the client device is determined by the server to be included in the first set of client devices (step 520), the server provides a communication quality of service enhancement to interactions between the prioritized client device 422 and the networked computer service (step 530). The communication quality of service enhancements prioritizes interactions between the prioritized client device 422 and the networked computer service. In some implementations, the quality of service enhancement is provided by prioritizing requests from the prioritized client device 422 at a server 430a or 430b hosting the networked computer service. For example, the server may maintain a separate "priority" queue for requests from prioritized client devices 422 in the first set of client devices and may resolve requests in this priority queue before resolving requests in a "normal" request queue (this may be balanced by a non-starvation parameter). In some implementations, the quality of service enhancement is provided by prioritizing data packets sent to the prioritized client device 422 as the packets traverse a data network controlled by the service provider, e.g., the service network 460. In some implementations, the quality of service enhancement is provided by setting a QoS flag in data packets sent to the prioritized client device 422. Generally, the communication quality of service enhancement simulates improved server and/or network capacity for the first set of client devices, as described above.

Where the client device is determined by the server not to be included in the first set of client devices (step 520), the server provides a normal communication quality of service enhancement to interactions between the client device and the networked computer service (step 540). That is, referring to FIG. 4, the server determines if the client device 120 is a non-prioritized device 426. For example, the server may maintain a separate "priority" queue for requests from prioritized devices 422 and a "normal" queue for requests from non-prioritized devices 426 not included in the first set of client devices. Requests may be placed in the "normal" queue and held until requests in the priority queue are resolved. In some implementations, a non-starvation parameter balances these queues allowing some requests in the "normal" queue to be processed while there are requests in the "priority" queue.

Referring back to FIGS. 1, 3 and 4, in some implementations, the data analyzer 140 may output recommendations based on the analysis in the method 300. For example, the data analyzer 140 may determine that a secondary server 430b did not reach capacity even while processing requests from client devices in the prioritized group of client devices. Thus improved load balancing between a first server 430a and the secondary server 430b may be sufficient to meet demand at the first server 430a.

In some implementations, the data analyzer generates a predicted revenue potential for the networked computer service based on the estimated latent computing resource demand. That is, if the estimated latent demand is converted to actual usage, the service may see an increase in revenue. This predicted revenue potential can be compared to the costs of purchasing and installing the additional resources needed to meet the estimated latent computing resource demand. Where the predicted revenue potential exceeds the provisioning costs, the data analyzer may output a recommendation to add resources to service these client devices. In some implementations, the data analyzer outputs an estimated cost to add resources to service the impacted clients.

In some implementations, the data analyzer 140 may compare groups of client devices in different networks and thus identify hot spots for infrastructure improvement. For example, the data analyzer 140 may compare usage by client devices 120 accessing the service via a first subnet 462a with usage by client devices 120 accessing the service via another subnet 462b. The data analyzer may identify that improvements in the first subnet 462a would satisfy more latent demand then equivalent improvements in the other subnet 462b.

Figure 6:
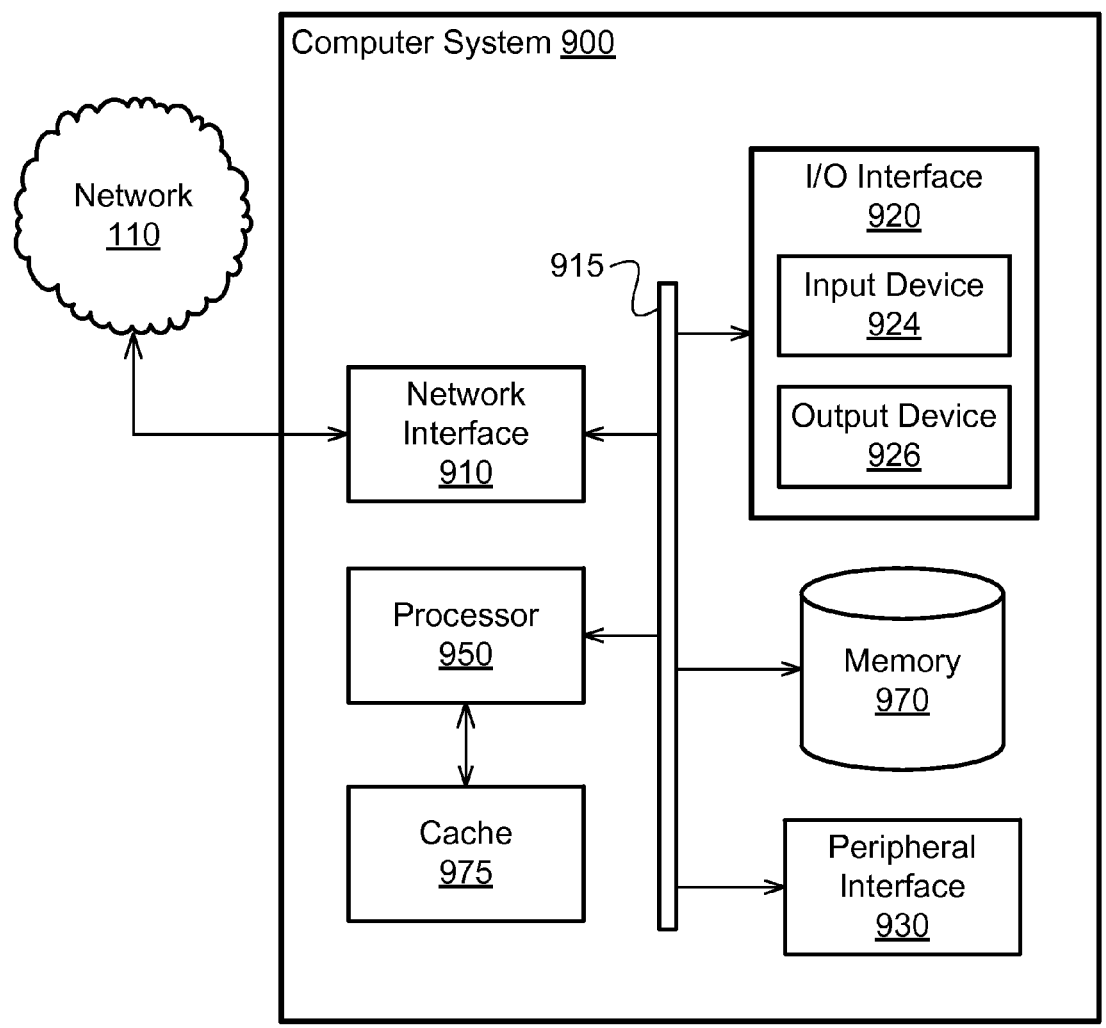
FIG. 6 is a block diagram of a computing system in accordance with an illustrative implementation.

FIG. 6 is a block diagram of a computing system 900 suitable for use in implementing the computerized components described herein. The computing system includes a processor for performing actions in accordance with instructions and one or more memory devices for storing instructions and data. The illustrative computer system 900 includes one or more processors 950 in communication, via a bus 915, with one or more network interfaces 910 (in communication with the network 110), optional I/O interfaces 920 (e.g., for interacting with a user or administrator), and memory 970. Generally, a processor 950 will receive instructions and data from a read only memory or a random access memory or both. The processor 950 can incorporate, or can be directly connected to, additional cache memory 975. In some uses, additional components are in communication with the computer system 900 via a peripheral interface 930. In some uses, such as in a server context, there is no I/O interface 920 or the I/O interface 920 is not used. In some uses, the I/O interface 920 supports an input device 924 and/or an output device 926. In some uses, the input device 924 and the output device 926 are integrated into the same hardware, for example, as in a touch screen.

In some implementations, the client devices 120 illustrated in FIG. 1 are constructed to be similar to the computer system 900 of FIG. 6. For example, a user interacts with an input device 924, e.g., a keyboard, mouse, or touch screen, at a client device 120 to access an interface, e.g., a web page, over the network 110. The interaction is received at the client device's network interface 910, and responses are output via an output device 926, e.g., a display, screen, touch screen, or speakers for presentation to the user.

In some implementations, one or more of the servers 130 illustrated in FIG. 1 are constructed to be similar to the computer system 900 of FIG. 6. In some implementations, a server 130 may be made up of multiple computer systems 900. In some implementations, a server may be a virtual server, for example, a cloud based server. A server 130 as illustrated in FIG. 1 may be made up of multiple computer systems 900 sharing a location or distributed across multiple locations. The multiple computer systems 900 forming a server may communicate using the user-accessible network 110. The multiple computer systems 900 forming a server may communicate using a private network, e.g., a data network distinct from the user-accessible network 110 or a virtual private network within the user-accessible network 110.

The processor 950 may be any logic circuitry that processes instructions, e.g., instructions fetched from the memory 970 or cache 975. In many embodiments, the processor 950 is a microprocessor unit, such as: those manufactured by Intel Corporation of Mountain View, Calif.; those manufactured by Motorola Corporation of Schaumburg, Ill.; those manufactured by Transmeta Corporation of Santa Clara, Calif.; the RS/6000 processor, those manufactured by International Business Machines of White Plains, N.Y.; or those manufactured by Advanced Micro Devices of Sunnyvale, Calif. The computing device 900 may be based on any of these processors, or any other processor capable of operating as described herein. The processor 950 may be a single core or multi-core processor. The processor 950 may be multiple processors.

The I/O interface 920 may support a wide variety of devices. Examples of an input device 924 include a keyboard, mouse, touch or track pad, trackball, microphone, touch screen, or drawing tablet. Example of an output device 926 include a video display, touch screen, speaker, braille terminal, inkjet printer, laser printer, dye-sublimation printer, or 3D printer. Examples of display devices include, but are not limited to, a CRT (cathode ray tube), LCD (liquid crystal display), LED (light emitting diode), OLED (organic LED), TFT (thin-film transistor), plasma, other flexible configuration, digital projector, or any other apparatus for displaying information, e.g., to a user. In some implementations, an input device 924 and/or output device 926 may function as a peripheral device connected via a peripheral interface 930.

A peripheral interface 930 supports connection of additional peripheral devices to the computing system 900. The peripheral devices may be connected physically, e.g., via FireWire or universal serial bus (USB), or wirelessly, e.g., via Bluetooth. Examples of peripherals include keyboards, pointing devices, display devices, braille terminals, audio devices, hubs, printers, media reading devices, storage devices, hardware accelerators, sound processors, graphics processors, antennae, signal receivers, sensors, measurement devices, and data conversion devices. In some uses, peripherals include a network interface and connect with the computer system 900 via the network 110 and the network interface 910. For example, a printing device may be a network accessible printer.

The computer system 900 can be any workstation, desktop computer, laptop or notebook computer, server, blade, handheld computer, tablet, mobile telephone or other portable telecommunication device, media playing device, a gaming system, mobile computing device, or any other type and/or form of computing, telecommunications or media device that is capable of communication and that has sufficient processor power and memory capacity to perform the operations described herein. For example, the computer system 900 may comprise a gaming device such as a PlayStation (PS 1/2/3/4/x) or Personal PlayStation Portable (PSP) device manufactured by the Sony Corporation of Tokyo, Japan, a Nintendo, Game Boy, or Wii device manufactured by Nintendo Co., Ltd., of Kyoto, Japan, or an XBox, XBox 360, or XBox One device manufactured by the Microsoft Corporation of Redmond, Wash. For example, the computer system 900 may comprise a tablet device such as one of the Nexus family of devices manufactured by Google Inc. of Mountain View, Calif. or one of the iPad family of devices manufactured by Apple Computer of Cupertino, Calif.

Implementations of the subject matter and the operations described in this specification can be implemented in digital electronic circuitry, or in computer software embodied on a tangible medium, firmware, or hardware, including the structures disclosed in this specification and their structural equivalents, or in combinations of one or more of them. Implementations of the subject matter described in this specification can be implemented as one or more computer programs embodied on a tangible medium, i.e., one or more modules of computer program instructions, encoded on one or more computer storage media for execution by, or to control the operation of, a data processing apparatus. A computer storage medium can be, or be included in, a computer-readable storage device, a computer-readable storage substrate, a random or serial access memory array or device, or a combination of one or more of them. The computer storage medium can also be, or be included in, one or more separate components or media (e.g., multiple CDs, disks, or other storage devices). The computer storage medium may be tangible and non-transitory.

The operations described in this specification can be implemented as operations performed by a data processing apparatus on data stored on one or more computer-readable storage devices or received from other sources.

The terms "client" or "server" include all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application specific integrated circuit). The apparatus can also include, in addition to hardware, code embodied on a tangible medium that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network. Examples of communication networks include a local area network ("LAN") and a wide area network ("WAN"), an inter-network (e.g., the Internet), and peer-to-peer networks (e.g., ad hoc peer-to-peer networks).

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application specific integrated circuit).

Implementations of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network.

The features disclosed herein may be implemented on a smart television module (or connected television module, hybrid television module, etc.), which may include a processing circuit configured to integrate Internet connectivity with more traditional television programming sources (e.g., received via cable, satellite, over-the-air, or other signals). The smart television module may be physically incorporated into a television set or may include a separate device such as a set-top box, Blu-ray or other digital media player, game console, hotel television system, and other companion device. A smart television module may be configured to allow viewers to search and find videos, movies, photos and other content on the web, on a local cable TV channel, on a satellite TV channel, or stored on a local hard drive. A set-top box (STB) or set-top unit (STU) may include an information appliance device that may contain a tuner and connect to a television set and an external source of signal, turning the signal into content which is then displayed on the television screen or other display device. A smart television module may be configured to provide a home screen or top level screen including icons for a plurality of different applications, such as a web browser and a plurality of streaming media services, a connected cable or satellite media source, other web "channels", etc. The smart television module may further be configured to provide an electronic programming guide to the user. A companion application to the smart television module may be operable on a mobile computing device to provide additional information about available programs to a user, to allow the user to control the smart television module, etc. In alternate embodiments, the features may be implemented on a laptop computer or other personal computer, a smartphone, other mobile phone, handheld computer, a tablet PC, or other computing device.

Multiple kinds of devices can be used to provide for interaction with a user. For example, feedback provided to the user can be any form of sensory feedback, e.g., visual feedback, auditory feedback, or tactile feedback, and input from the user can be received in any form, including acoustic, speech, or tactile input. In addition, a computing system can interact with a user by sending documents to and receiving documents from a device that is used by the user, e.g., by sending webpages to a web browser on a user's client device in response to requests received from the web browser.

In situations in which the systems discussed here collect personal information about users, or may make use of personal information, the users may be provided with an opportunity to control whether programs or features collect user information (e.g., information about a user's social network, social actions or activities, profession, a user's preferences, or a user's current location), or to control whether and/or how to receive content from the content server that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by a content server.

While this specification contains many specific implementation details, these should not be construed as limitations on the scope of any inventions or of what may be claimed, but rather as descriptions of features specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

References to "or" may be construed as inclusive so that any terms described using "or" may indicate any of a single, more than one, and all of the described terms. The labels "first," "second," "third," an so forth are not necessarily meant to indicate an ordering and are generally used merely to distinguish between like or similar items or elements.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking or parallel processing may be utilized.

What is claimed is:

1. A method of estimating latent computing resource demand, the method comprising:
   collecting, by a data analyzer, interaction data for interactions between a plurality of client devices communicating with a networked computer service comprising a first computer server and a second computer server, the plurality of client devices comprising:
      a first set of client devices randomly selected from a population of client devices communicating with the networked computer service, wherein communications between the networked computer service and the client devices in the first set receive a first communication quality of service enhancement, and
      a second set of client devices randomly selected from the population of client devices communicating with the networked computer service not in the first set of client devices, wherein communications between the networked computer service and the client devices in the second set do not receive the first communication quality of service enhancement, wherein the first communication quality of service enhancement comprises one or more of:
         maintaining, by the first computer server, a separate priority queue for processing requests from the first set of client devices,
         modifying, by the first computer server, the route used for communications with the first set of client devices such that communications with the first set of client devices are carried over network links with increased bandwidth or spare capacity relative to communications with the second set of client devices, or
         redirecting, by the first computer server, the requests from the first set of client devices to the second computer server, the second computer server having one or more of a higher availability, a higher performance, or a higher throughput than the first computer server;
   identifying, by the data analyzer, a first usage level represented by the interaction data collected for the first set of client devices;
   identifying, by the data analyzer, a second usage level represented by the interaction data collected for the second set of client devices; and
   determining, by the data analyzer, an estimated latent computing resource demand based on a comparison of the first usage level to the second usage level.

2. The method of claim 1, wherein each communication between the networked computer service and a client device in the population of client devices comprises one or more data packets flowing through a data network and the first communication quality of service enhancement comprises prioritizing the one or more data packets within the data network.

3. The method of claim 1, wherein collecting interaction data by the data analyzer comprises parsing one or more server transaction logs.

4. The method of claim 1, comprising dynamically selecting a client device for inclusion in one of the first set of client devices and the second set of client devices based on a function of an anonymous identifier randomly assigned to the client device.

5. The method of claim 1, wherein the population of client devices is a sub-set of all client devices communicating with the networked computer service and the population of client devices has at least one characteristic in common.

6. The method of claim 5, wherein the at least one characteristic in common is one of:
   a data network accessed by each client device in the population of client devices;
   a client device type for each client device in the population of client devices;
   a geographic location for each client device in the population of client devices; and
   an Internet service provider used by each client device in the population of client devices.

7. The method of claim 1, wherein the population of client devices communicate with the networked computer service via a plurality of data networks, the method comprising determining, by the data analyzer, that an estimated latent computing resource demand in a first network of the plurality of data networks is greater than an estimated latent computing resource demand in a second network of the plurality of data networks.

8. The method of claim 1, wherein the first communication quality of service enhancement is redirecting, by the first computer server, the requests from the first set of client devices to the second computer server, the second computer server having one or more of a higher availability, a higher performance, or a higher throughput than the first computer server.

9. The method of claim 1, comprising generating, by the data analyzer, a predicted revenue potential for the networked computer service based on the estimated latent computing resource demand.

10. The method of claim 9, wherein the predicted revenue potential is based on an infrastructure upgrade providing a second service enhancement different from the first communication quality of service enhancement.

11. A system for estimating latent computing resource demand, the system comprising a network interface and one or more processors communicatively coupled with the network interface and configured to:
   collect interaction data for interactions between a plurality of client devices communicating with a networked computer service comprising a first computer server and a second computer server, the plurality of client devices comprising
      a first set of client devices randomly selected from a population of client devices communicating with the networked computer service, wherein communications between the networked computer service and the client devices in the first set receive a first communication quality of service enhancement, and
      a second set of client devices randomly selected from the population of client devices communicating with the networked computer service not in the first set of client devices, wherein communications between the networked computer service and the client devices in the second set do not receive the first communication quality of service enhancement, wherein the first communication quality of service enhancement comprises one or more of:
    maintaining, by the first computer server, a separate priority queue for processing requests from the first set of client devices,
    modifying, by the first computer server, the route used for communications with the first set of client devices such that communications with the first set of client devices are carried over network links with increased bandwidth or spare capacity relative to communications with the second set of client devices, or
    redirecting, by the first computer server, the requests from the first set of client devices to the second computer server, the second computer server having one or more of a higher availability, a higher performance, or a higher throughput than the first computer server;
identify a first usage level represented by the interaction data collected for the first set of client devices;
identify a second usage level represented by the interaction data collected for the second set of client devices; and
determine an estimated latent computing resource demand based on a comparison of the first usage level to the second usage level.

12. The system of claim 11, wherein each communication between the networked computer service and a client device in the population of client devices comprises one or more data packets flowing through a data network and the first communication quality of service enhancement comprises prioritizing the one or more data packets within the data network.

13. The system of claim 11, the one or more processors configured to collect interaction data by parsing one or more server transaction logs.

14. The system of claim 11, the one or more processors configured to dynamically select a client device for inclusion in one of the first set of client devices and the second set of client devices based on a function of an anonymous identifier randomly assigned to the client device.

15. The system of claim 11, wherein the population of client devices is a sub-set of all client devices communicating with the networked computer service.

16. The system of claim 11, wherein the population of client devices communicate with the networked computer service via a plurality of data networks, the one or more processors configured to determine that an estimated latent computing resource demand in a first network of the plurality of data networks is greater than an estimated latent computing resource demand in a second network of the plurality of data networks.

17. The system of claim 11, wherein the first communication quality of service enhancement is redirecting, by the first computer server, the requests from the first set of client devices to a second computer server, the second computer server having one or more of a higher availability, a higher performance, or a higher throughput than the first computer server.

18. The system of claim 11, the one or more processors configured to generate a predicted revenue potential for the networked computer service based on the estimated latent computing resource demand.

19. The system of claim 18, wherein the predicted revenue potential is based on an infrastructure upgrade providing a second service enhancement different from the first communication quality of service enhancement.

20. Tangible computer readable storage media storing non-transient processor-executable instructions that, when executed by a computing device comprising the storage media and one or more processors, cause the one or more processors to:
collect interaction data for interactions between a plurality of client devices communicating with a networked computer service comprising a first computer server and a second computer server, the plurality of client devices comprising
    a first set of client devices randomly selected from a population of client devices communicating with the networked computer service, wherein communications between the networked computer service and the client devices in the first set receive a first communication quality of service enhancement, and
    a second set of client devices randomly selected from the population of client devices communicating with the networked computer service not in the first set of client devices, wherein communications between the networked computer service and the client devices in the second set do not receive the first communication quality of service enhancement, wherein the first communication quality of service enhancement comprises one or more of:
        maintaining, by the first computer server, a separate priority queue for processing requests from the first set of client devices,
        modifying, by the first computer server, the route used for communications with the first set of client devices such that communications with the first set of client devices are carried over network links with increased bandwidth or spare capacity relative to communications with the second set of client devices, or
        redirecting, by the first computer server, the requests from the first set of client devices to the second computer server, the second computer server having one or more of a higher availability, a higher performance, or a higher throughput than the first computer server;
identify a first usage level represented by the interaction data collected for the first set of client devices;
identify a second usage level represented by the interaction data collected for the second set of client devices; and
determine an estimated latent computing resource demand based on a comparison of the first usage level to the second usage level.

21. The tangible computer readable storage media of claim 20, wherein the first communication quality of service enhancement is modifying, by the first computer server, the route used for communications with the first set of client devices such that communications with the first set of client devices are carried over network links with increased bandwidth or spare capacity relative to communications with the second set of client devices.

22. The tangible computer readable storage media of claim 20, wherein the first communication quality of service enhancement is maintaining, by the first computer server, the separate priority queue for processing requests from the first set of client devices.

23. The tangible computer readable storage media of claim 20, wherein the first communication quality of service enhancement is redirecting, by the first computer server, the requests from the first set of client devices to the second computer server, the second computer server having one or more of a higher availability, a higher performance, or a higher throughput than the first computer server.

24. The method of claim 1, wherein the first communication quality of service enhancement is modifying, by the first computer server, the route used for communications with the first set of client devices such that communications with the first set of client devices are carried over network links with increased bandwidth or spare capacity relative to communications with the second set of client devices.

25. The method of claim 1, wherein the first communication quality of service enhancement is maintaining, by the first computer server, the separate priority queue for processing requests from the first set of client devices.

26. The system of claim 18, wherein the first communication quality of service enhancement is modifying, by the first computer server, the route used for communications with the first set of client devices such that communications with the first set of client devices are carried over network links with increased bandwidth or spare capacity relative to communications with the second set of client devices.

27. The system of claim 18, wherein the first communication quality of service enhancement is maintaining, by the first computer server, the separate priority queue for processing requests from the first set of client devices.

\* \* \* \* \*